United States Patent

Miyake

(10) Patent No.: US 9,571,027 B2
(45) Date of Patent: Feb. 14, 2017

(54) POWER CONVERSION DEVICE CONTROL DEVICE AND POWER CONVERSION DEVICE CONTROL METHOD

(71) Applicant: Mitsubishi Electric Corporation, Tokyo (JP)

(72) Inventor: Toru Miyake, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/792,836

(22) Filed: Jul. 7, 2015

(65) Prior Publication Data

US 2016/0105127 A1    Apr. 14, 2016

(30) Foreign Application Priority Data

Oct. 8, 2014  (JP) ................. 2014-206987

(51) Int. Cl.
| | | |
|---|---|---|
| *H02M 7/44* | (2006.01) | |
| *H02P 27/08* | (2006.01) | |
| *H02M 1/44* | (2007.01) | |
| *H02M 7/5395* | (2006.01) | |

(52) U.S. Cl.
CPC ............... *H02P 27/08* (2013.01); *H02M 1/44* (2013.01); *H02M 7/5395* (2013.01)

(58) Field of Classification Search
CPC ......... H02M 1/44; H02M 7/5395; H02P 27/08
USPC ........................................................ 363/97
See application file for complete search history.

(56) References Cited

U.S. PATENT DOCUMENTS

2010/0164416 A1*  7/2010  Yamada .................. H02M 1/12
                                                          318/400.13

FOREIGN PATENT DOCUMENTS

| JP | 2006174645 A | * | 6/2006 |
|---|---|---|---|
| JP | 20061764645 A | | 6/2006 |
| JP | 2006304600 A | * | 11/2006 |
| JP | 2010004725 A | * | 1/2010 |
| JP | 2012-165486 A | | 8/2012 |
| JP | 2013-219916 A | | 10/2013 |
| JP | 2014050213 A | | 3/2014 |

OTHER PUBLICATIONS

Communication dated Jan. 5, 2016, from the Japanese Patent Office in counterpart application No. 2014-206987.

* cited by examiner

*Primary Examiner* — Adolf Berhane
*Assistant Examiner* — Afework Demisse
(74) *Attorney, Agent, or Firm* — Sughrue Mion, PLLC; Richard C. Turner

(57) ABSTRACT

Provided are a power conversion device control device and a power conversion device control method, which are capable of reducing harm to other electronic devices and electromagnetic noise due to a switching frequency compared to the related art. Carrier change patterns of the respective phases, which are defined by parameters of an average switching frequency, a spectral diffusion index, and a repetition frequency, are generated so that at least the carrier change pattern of one phase differs from the carrier change patterns of the other phases. Semiconductor switching elements are controlled as instructed by duty command values while the switching frequency is switched for each phase separately, from one frequency to another sequentially based on carriers output in patterns that follow the generated carrier change patterns.

5 Claims, 11 Drawing Sheets

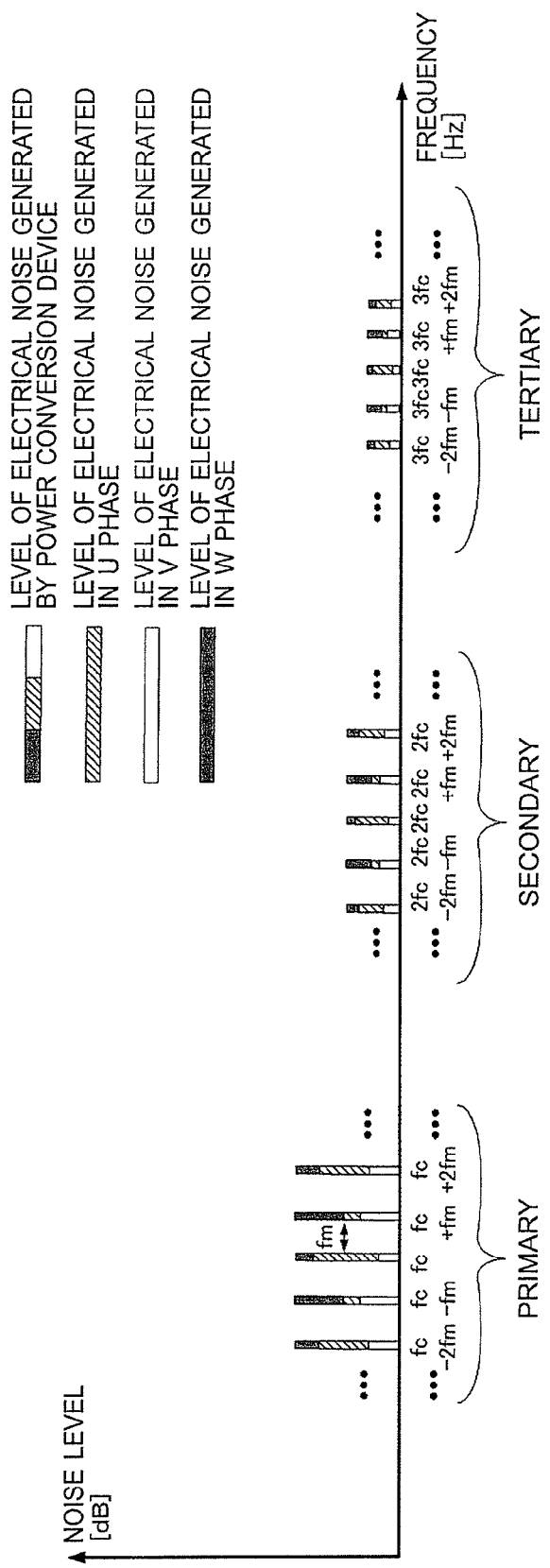

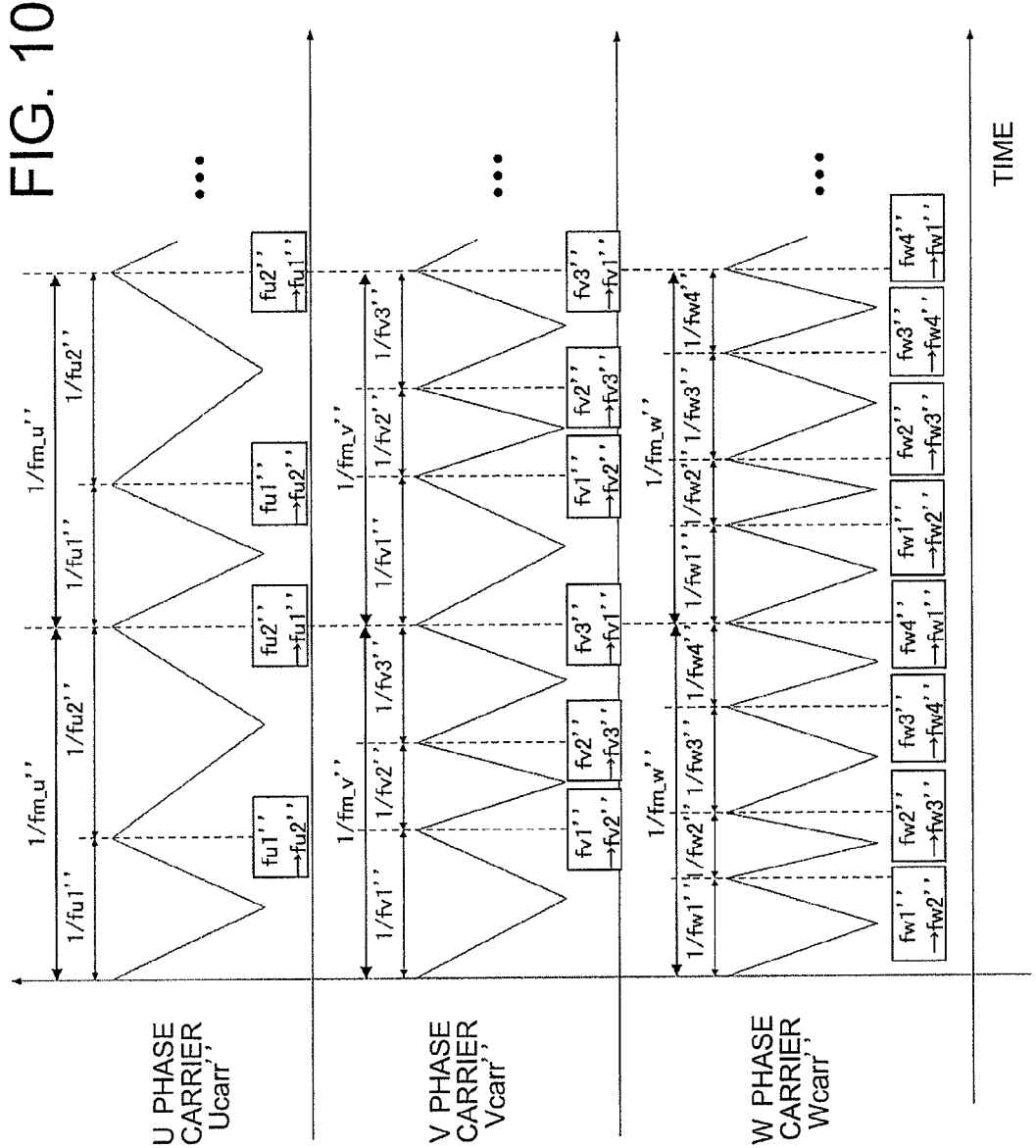

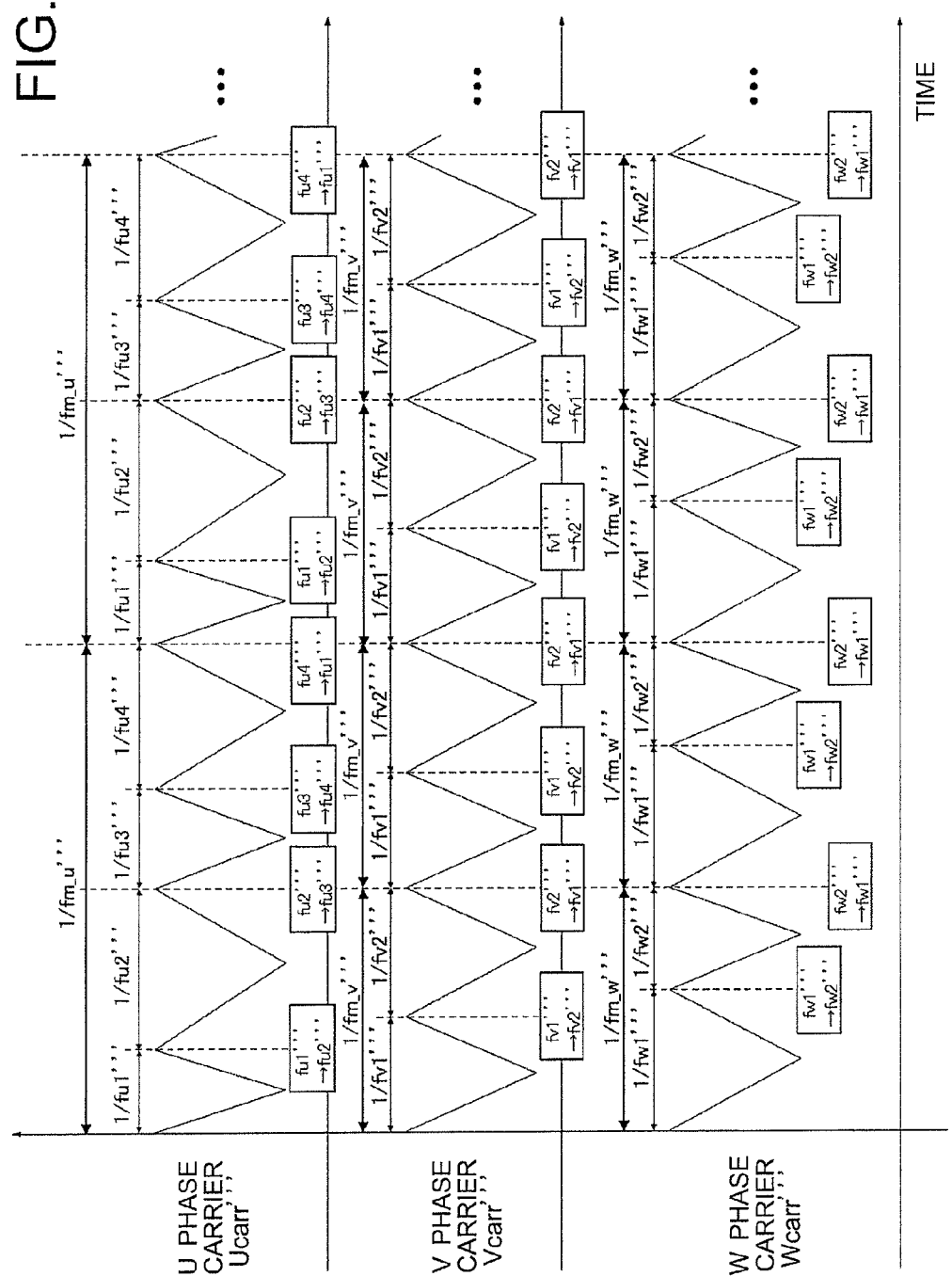

POWER CONVERSION DEVICE CONTROL DEVICE AND POWER CONVERSION DEVICE CONTROL METHOD

BACKGROUND OF THE INVENTION

1. Field of the Invention

The present invention relates to a control device for controlling the switching of a switching element of a power conversion device, and more particularly, to a power conversion device control device and a power conversion device control method, which control the switching of a switching element by pulse width modulation (PWM).

2. Description of the Related Art

When the switching on/off of a switching element of a power conversion device is controlled with a constant switching frequency, electrical noise of high noise level is generated in some cases due to the switching frequency. The electrical noise generated by the power conversion device can harm other electronic devices by causing malfunction, breakdown, and the like. In addition, if the switching frequency used to control the switching of the switching element is in the auditory range of humans (specifically, a frequency range of 20 Hz to 20,000 Hz), electromagnetic noise due to the switching frequency can cause auditory noise.

Arranging a snubber circuit, a noise filter, or other noise countermeasure parts on the power conversion device in order to control the electrical noise results inevitably in an increase in cost and device size. Therefore, there has hitherto been proposed a technology of lowering the peak value of electrical noise generated by a power conversion device by diffusing the electrical noise, without arranging noise countermeasure parts thereon.

Specifically, the switching frequency for controlling the switching of switching elements that are arranged in half-bridge circuits of respective phases in a power conversion device is varied from one half-bridge circuit to another (see, for example, Japanese Patent Application Laid-open No. 2013-219916). Another way is to set the same switching frequency to control switching elements that are arranged in half-bridge circuits of the respective phases in a power conversion device, and to switch the switching frequency with time from one frequency out of a plurality of switching frequency levels to another frequency sequentially (see, for example, Japanese Patent Application Laid-open No. 2012-165486).

However, the related art has the following problems.

In the related art of Japanese Patent Application Laid-open No. 2013-219916, where the switching frequency varies from the half-bridge circuit of one phase to the half-bridge circuit of another, electrical noise generated by one half-bridge circuit is not superimposed on electrical noise generated by another half-bridge circuit. Although this brings about an effect in that the electrical noise is diffused more than when the switching frequency is constant, the peak value of the electrical noise generated by each half-bridge circuit is still high. The resultant problem is a chance of electromagnetic noise being generated due to the switching frequency, as well as a chance for harm to other electronic devices.

In the related art of Japanese Patent Application Laid-open No. 2012-165486, electrical noise generated by the power conversion device increases in proportion to the number of half-bridge circuits that are arranged in the power conversion device. This means that the related art of Japanese Patent Application Laid-open No. 2012-165486 applied to a multi-phase inverter is lower in electrical noise diffusing effect when the number of half-bridge circuits included in the multi-phase inverter is higher. The resultant problem is a chance of electromagnetic noise being generated due to the switching frequency, as well as a chance for harm to other electronic devices.

SUMMARY OF THE INVENTION

The present invention has been made to solve the problems described above, and an object of the present invention is to provide a power conversion device control device and a power conversion device control method, which are capable of reducing harm to other electronic devices and electromagnetic noise due to a switching frequency compared to the related art.

According to one embodiment of the present invention, there is provided a power conversion device control device for controlling, in time with PWM signals that are generated from duty command values and switching frequencies, a multi-phase inverter in which a plurality of half-bridge circuits each including one semiconductor switching element in an upper arm and one semiconductor switching element in a lower arm are connected in parallel, the power conversion device control device including: a carrier generating unit for outputting, for each of multiple phases, a carrier in a pattern that follows a carrier change pattern set so that switching processing in which a plurality of switching frequencies are switched sequentially is repeated for each repetition cycle, which is a reciprocal of a repetition frequency; and a PWM signal generating unit for generating the PWM signals, which are used for controlling the semiconductor switching elements as instructed by the duty command values, while sequentially switching from one of the plurality of switching frequencies to another for each phase separately, based on the carrier input from the carrier generating unit, in which the carrier generating unit generates the carrier change patterns of the respective phases, which are defined by parameters of an average switching frequency, a spectral diffusion index, and the repetition frequency, so that at least the carrier change pattern of one phase differs from the carrier change patterns of the other phases.

Further, according to one embodiment of the present invention, there is provided a power conversion device control method, including: a carrier generation step of outputting, in a multi-phase inverter in which a plurality of half-bridge circuits each including one semiconductor switching element in an upper arm and one semiconductor switching element in a lower arm are connected in parallel, for each of multiple phases, a carrier in a pattern that follows a carrier change pattern set so that switching processing in which a plurality of switching frequencies are switched sequentially is repeated for each repetition cycle, which is a reciprocal of a repetition frequency; and a PWM signal generation step of generating PWM signals, which are used for controlling the semiconductor switching elements as instructed by duty command values, while sequentially switching from one of the plurality of switching frequencies to another for each phase separately, based on the carrier output in the carrier generation step, in which the carrier generation step includes generating the carrier change patterns of the respective phases, which are defined by parameters of an average switching frequency, a spectral diffusion index, and the repetition frequency, so that at least the carrier change pattern of one phase differs from the carrier change patterns of the other phases.

According to the one embodiment of the present invention, the control device or the control method includes the configuration for generating, for respective phases, carrier change patterns, which are defined by parameters of the average switching frequency, the spectral diffusion index, and the repetition frequency, so that the carrier change pattern of at least one of the phases differs from the carrier change patterns of the other phases. Thus, it is possible to obtain the power conversion device control device and the power conversion device control method, which are capable of reducing harm to other electronic devices and the electromagnetic noise due to the switching frequency compared to the related art.

BRIEF DESCRIPTION OF THE DRAWINGS

FIG. 9 is an explanatory diagram for showing electrical noise that is generated by an inverter unit of the power conversion device in the respective phases in the second embodiment of the present invention.

FIG. 10 is an explanatory diagram for showing an example of carriers that are generated for the respective phases by a carrier generating unit in a third embodiment of the present invention.

FIG. 11 is an explanatory diagram for showing an example of carriers that are generated for the respective phases by a carrier generating unit in a fourth embodiment of the present invention.

DETAILED DESCRIPTION OF THE PREFERRED EMBODIMENTS

A power conversion device control device and power conversion device control method according to exemplary embodiments of the present invention are described below with reference to the drawings. Components that are the same or equivalent to one another are denoted by the same reference symbol throughout the drawings in order to omit a duplicate description. The following embodiments take as an example a case where the invention of this application is applied to a power conversion device, which includes a three-phase inverter having a U phase, a V phase, and a W phase, and to which electric motor is connected as load.

First Embodiment

Figure 1:
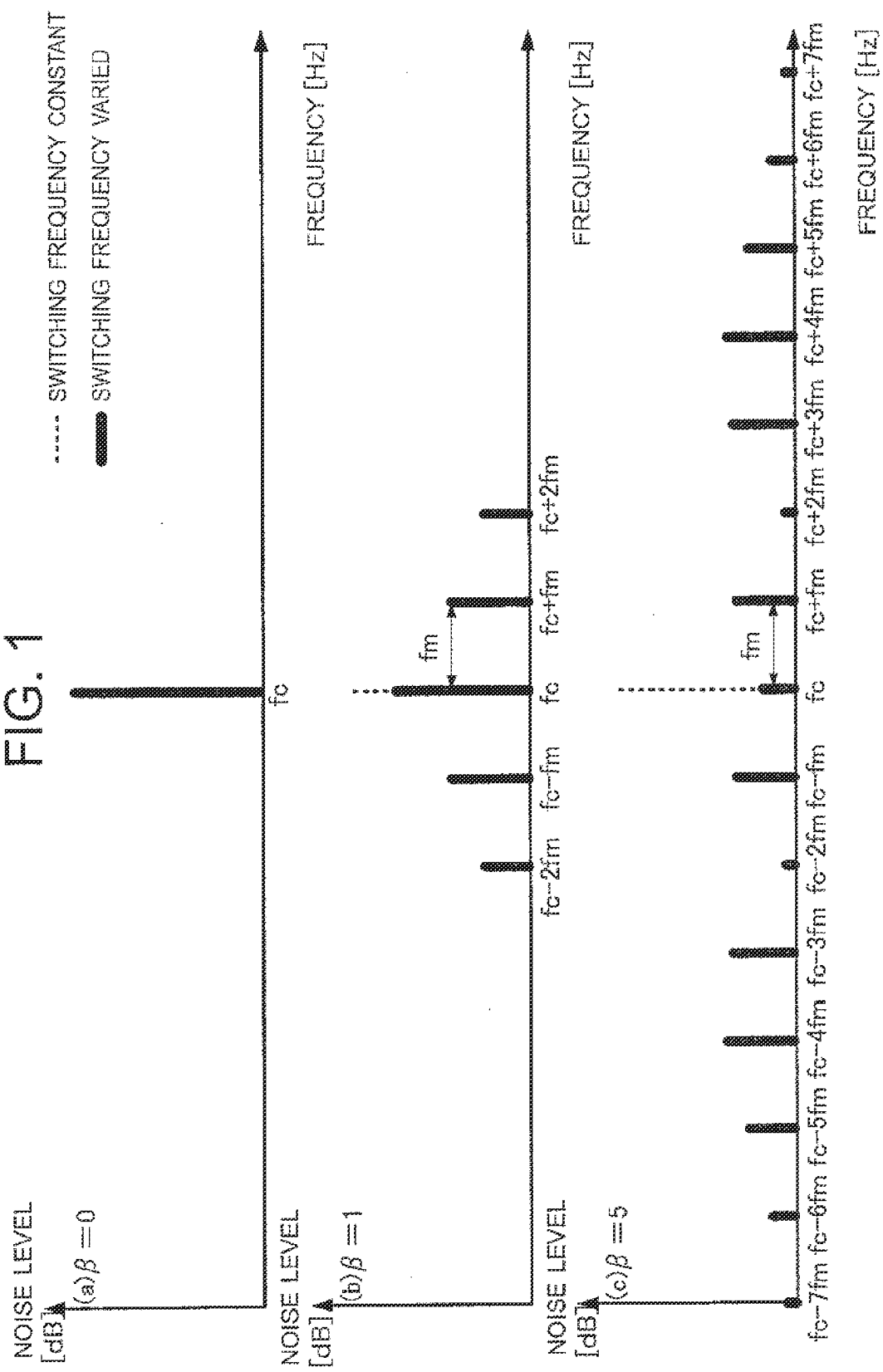
FIG. 1 is an explanatory diagram for showing a relation between a spectral diffusion index and the noise level of electrical noise, which is referred to in a first embodiment of the present invention in order to describe problems of the related art.

Problems of the related art that the inventors of the present invention have newly paid attention to are described first with reference to FIG. 1 in order to clarify a technical feature of a power conversion device control device and power conversion device control method according to the invention of this application. FIG. 1 is an explanatory diagram for showing a relation between a spectral diffusion index $\beta$ and the noise level of electrical noise, which is referred to in a first embodiment of the present invention in order to describe problems of the related art.

Discussed here is a case where switching processing of sequentially switching from one switching frequency to another is repeated cyclically. In the following description, a plurality of switching frequencies included in one round of switching processing are referred to as switching frequency set, and a cycle for repeating the switching processing is referred to as repetition cycle Tm.

A maximum switching frequency fmax and a minimum switching frequency fmin in one switching frequency set, the repetition cycle Tm, and the spectral diffusion index $\beta$ in this case have a relation expressed by Expression (1). In Expression (1), a difference between the maximum switching frequency fmax and the minimum switching frequency fmin is expressed as switching frequency difference $\Delta f$. The reciprocal of the repetition cycle Tm is a repetition frequency fm.

$$\beta = (f\max - f\min) \times Tm \qquad \text{Expression (1)}$$
$$= \Delta f / fm$$

Expression (1) is described in, for example, Feng Lin et al, "Reduction of Power Supply EMI Emission by Switching Frequency Modulation", IEEE TRANSACTIONS ON POWER ELECTRONICS, VOL. 9, ISS. 1, Jan. 1994. As is understood from Expression (1), the spectral diffusion index $\beta$ is larger when the repetition frequency fm is lower or when the switching frequency difference Of is larger. When the spectral diffusion index $\beta$ is larger, electrical noise is diffused more and the peak value of the electrical noise is smaller.

A specific example of electrical noise spectral diffusion by way of the spectral diffusion index $\beta$ is described subsequently with reference to FIG. 1. In FIG. 1, switching frequencies included in the switching frequency set are a switching frequency f1 and a switching frequency f2, and processing of switching between the switching frequencies f1 and f2 is repeated in the repetition cycle Tm. In short, the premise of FIG. 1 is that switching is repeated so that the switching frequencies alternate between the switching frequencies f1 and f2.

The repetition frequency fm and switching frequencies f1 and f2 of FIG. 1 in this case have a relation expressed by Expression (2).

$$1/fm = 1/f1 + 1/f2 \qquad \text{Expression (2)}$$

As is understood from Expression (2), the repetition cycle Tm, which is the reciprocal of the repetition frequency fm, equals to the sum of the reciprocal of the switching frequency f1 and the reciprocal of the switching frequency f2, namely, the sum of a switching cycle T1 and a switching cycle T2.

An average switching frequency fc shown in FIG. 1 is expressed by Expression (3) with the use of a pulse count Pcnt, which equals to the number of switching frequencies included in one switching frequency set. The switching frequency set here includes two switching frequencies, f1 and f2, and the pulse count Pcnt is therefore 2.

$$fc = Pcnt/(1/f1 + 1/f2)$$
$$= Pcnt \times fm$$

Expression (3)

As an example, the spectra of electrical noise at the time when the spectral diffusion index β is 0 ((a) β=0), is 1 ((b) β=1), and is 5 ((c) β=5) are shown in FIG. 1. In Case (a), f1=f2 is established from Expression (1). The spectrum of Case (a) is therefore equivalent to an electrical noise spectrum that is obtained when the switching of a switching element is controlled with a constant switching frequency.

As can be seen in FIG. 1, the spectrum of electrical noise changes with the spectral diffusion index β, the average switching frequency fc, and the repetition frequency fm as parameters. Specifically, electrical noise having a peak value in a component that is expressed by fc±n×fm (n=0, 1, 2 ... ) is generated, and the peak value of the electrical noise becomes smaller when the spectral diffusion index β increases and the spectrum of the electrical noise becomes dispersed.

As can be seen in FIG. 1, the electrical noise spectrum is dispersed over a wider range and the peak value of the original electrical noise is lowered more when processing of switching the switching frequency is executed repeatedly, than when a constant switching frequency is used as in the related art of Japanese Patent Application Laid-open No. 2013-219916.

In the related art of Japanese Patent Application Laid-open No. 2012-165486, the electrical noise having a peak value in the component fc±n×fm is generated by each half-bridge circuit because of how the technology is configured, and the superimposition of electrical noise that has a peak value in one component on electrical noise that has a peak value in another component occurs more frequently when the number of half-bridge circuits increases. The electrical noise diffusing effect in which the electrical noise spectrum is dispersed and the peak value of the electrical noise is lowered diminishes as a result.

The related art of Japanese Patent Application Laid-open No. 2012-165486 applied to a multi-phase inverter is lower in electrical noise diffusing effect when the number of half-bridge circuits that are included in the multi-phase inverter is higher, and consequently cannot prevent harm to other electronic devices and the generation of electromagnetic noise due to the switching frequency. The inventors of the present invention have paid attention on this problem, taking the observation that is described above into consideration.

The invention of this application therefore provides the power conversion device control device and the power conversion device control method, which are capable of reducing harm to other electronic devices and the electromagnetic noise due to the switching frequency compared to the related art.

Figure 2:
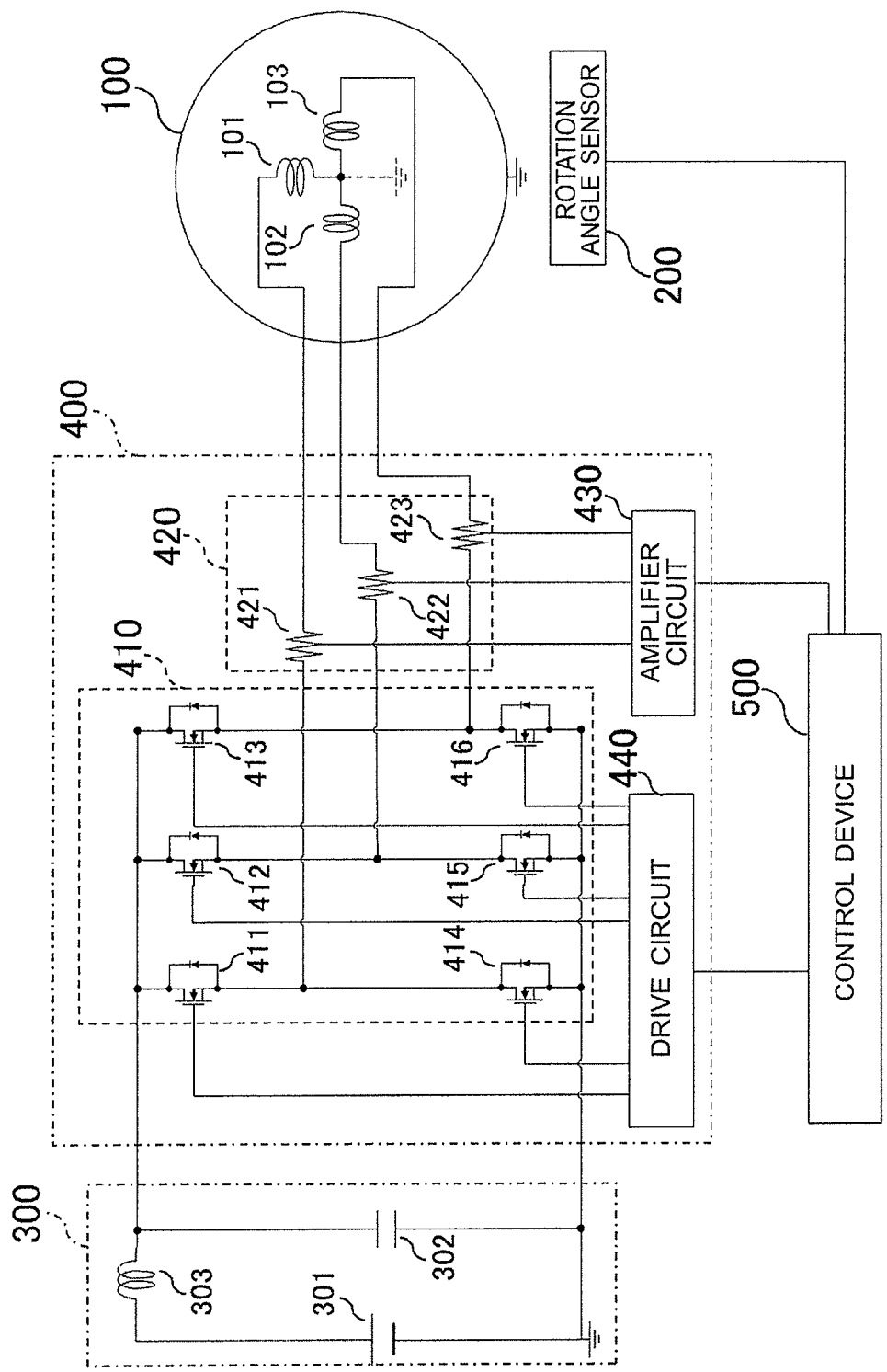
FIG. 2 is a configuration diagram for illustrating an electric motor control system that includes a power conversion device control device according to the first embodiment of the present invention.
Figure 3:
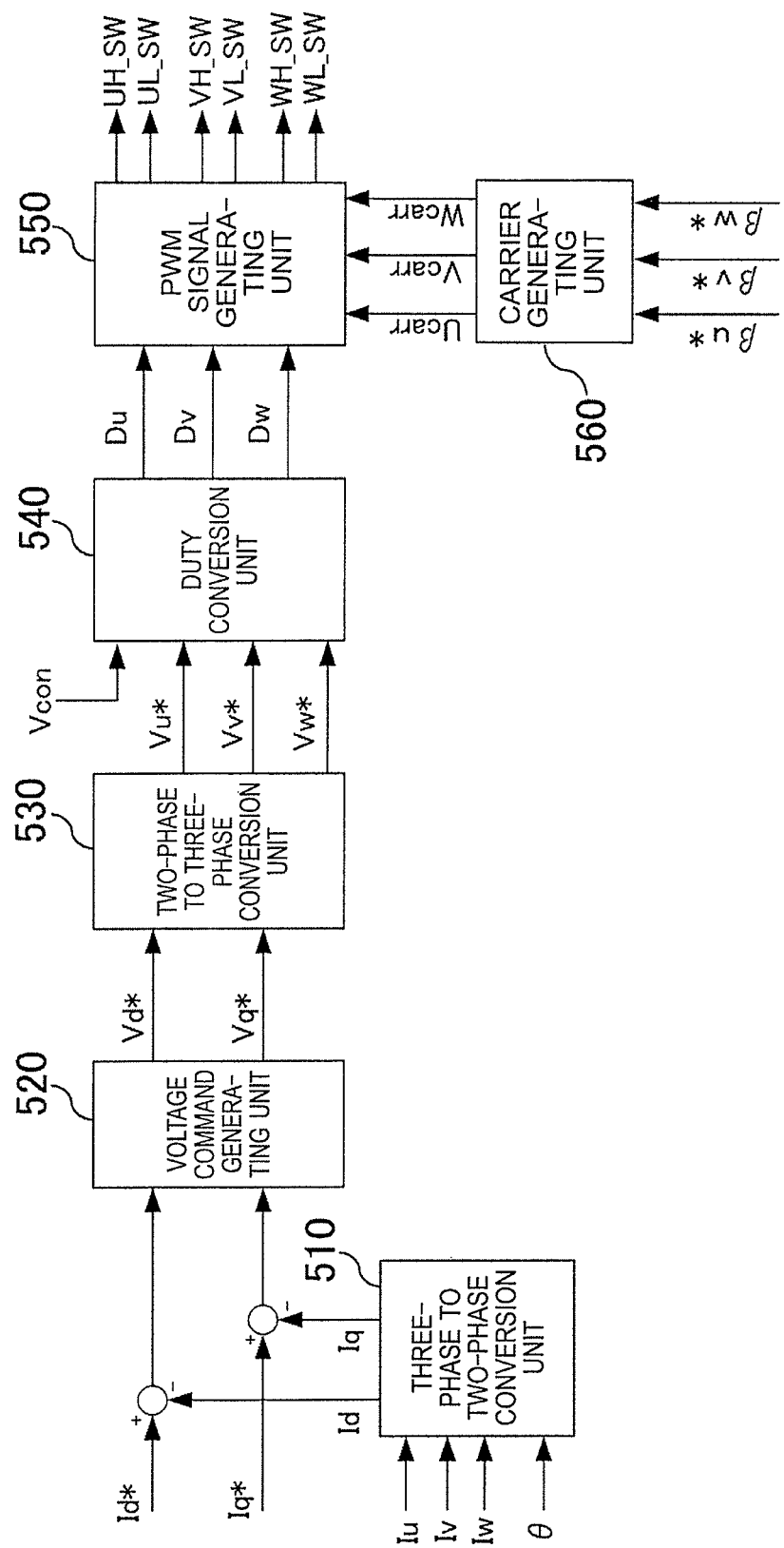
FIG. 3 is a block diagram for illustrating the configuration and processing of the power conversion device control device according to the first embodiment of the present invention.

A power conversion device control device 500 according to the first embodiment is described next with reference to FIG. 2 and FIG. 3. FIG. 2 is a configuration diagram for illustrating an electric motor control system that includes the power conversion device control device 500 according to the first embodiment of the present invention. FIG. 3 is a block diagram for illustrating the configuration and processing of the power conversion device control device 500 according to the first embodiment of the present invention.

As illustrated in FIG. 2, the electric motor control system includes a piece of electric motor 100, a rotation angle sensor 200, a power supply unit 300, a power conversion device 400, and the power conversion device control device 500 (hereinafter shortened to "control device 500").

The electric motor 100 is, for example, a vehicle-mounted electric motor. The vehicle-mounted electric motor here is specifically one that is used in a driving motor for driving a vehicle, an electric fan, an oil pump, a water pump, an electric power steering device for assisting in a steering operation of a vehicle, or the like. The electric motor 100 is not limited to a vehicle-mounted electric motor and can be an electric motor for other uses than the vehicle-mounted application.

The electric motor 100 in the following description is a three-phase brushless motor, which has a rotor and a stator. The rotor (not shown) is a disk-shaped member, and a permanent magnet is mounted on a surface of the disk to arrange a magnetic pole. The stator houses the rotor inside in a manner that allows the rotor to rotate relatively. The stator has protrusions, which protrude inward radially at preset angle intervals, and a U phase coil 101, a V phase coil 102, and a W phase coil 103 are wound around the protrusions.

The rotation angle sensor 200 is mounted on the electric motor 100 to detect position information that indicates the rotor position of the electric motor 100 (specifically, the rotation angle of the rotor). The rotation angle of the rotor detected by the rotation angle sensor 200 is converted into an electrical angle θ, and the electrical angle θ is input to the control device 500, which is described later. The rotation angle sensor 200 includes, for example, a resolver.

The power supply unit 300 is a drive source of the electric motor 100 and outputs electric power to the power conversion device 400. In a specific configuration example of the power supply unit 300, the power supply unit 300 includes a battery 301, a capacitor 302, and a choke coil 303.

The capacitor 302 and the choke coil 303 are interposed between the battery 301 and an inverter unit 410, which is described later, to form a power filter. This configuration reduces noise that is transmitted to the inverter unit 410 from another device that shares the battery 301, and simultaneously reduces noise that is transmitted from the inverter unit 410 to the other device that shares the battery 301. The capacitor 302 accumulates electric charges to supplement power that is supplied separately to switching elements 411 to 416, which are described later, and also to reduce noise components such as a surge current. A voltage Vcon of the capacitor 302 is obtained by the control device 500.

The power conversion device 400 converts electric power supplied from the power supply unit 300, and outputs the converted electric power to the electric motor 100. In a specific configuration example of the power conversion device 400, the power conversion device 400 includes the inverter unit 410, a current detecting unit 420, an amplifier circuit 430, and a drive circuit 440.

In the inverter unit 410, three half-bridge circuits are connected in parallel, and each of the half-bridge circuits has one semiconductor switching element in an upper arm and one semiconductor switching element in a lower arm. Specifically, the inverter unit 410 includes the switching elements 411 to 416. The inverter unit 410 is a three-phase inverter, and the six switching elements 411 to 416 are connected by bridge connection in order to switch from one to another out of electrical connection to the U phase coil 101, electrical connection to the V phase coil 102, and electrical connection to the W phase coil 103. The switching elements 411 to 416 can be MOSFETs, which are a type of field effect transistor, or may be transistors of other types than MOSFET such as IGBTs. In the following description, the switching elements 411 to 416 are referred to as SWs 411 to 416.

Drains of three SWs 411 to 413 are connected to the positive side of the battery 301. Sources of the SWs 411 to 413 are connected to drains of the SWs 414 to 416. Sources of the SWs 414 to 416 are connected to the negative side of the battery 301.

A connection point where the SW 411 and the SW 414, which are a pair, are connected is connected to one end of the U phase coil 101. A connection point where the SW 412 and the SW 415, which are a pair, are connected is connected to one end of the V phase coil 102. A connection point where the SW 413 and the SW 416, which are a pair, are connected is connected to one end of the W phase coil 103.

In the following description, the SWs 411 to 413, which are switching elements disposed on the high electric potential side, are referred to as "upper SWs", and the SWs 414 to 416, which are switching elements disposed on the low electric potential side, are referred to as "lower SWs". The electric potential on the low electric potential side is 0 V in the first embodiment for an easier understanding of the description.

The current detecting unit 420 includes a U phase current detecting unit 421, a V phase current detecting unit 422, and a W phase current detecting unit 423. In the following description, the U phase current detecting unit 421, the V phase current detecting unit 422, and the W phase current detecting unit 423 may be referred to as current detecting units 421 to 423 in some places.

The U phase current detecting unit 421 detects a U phase current Iu as a current that flows in the U phase coil 101. The V phase current detecting unit 422 detects a V phase current Iv as a current that flows in the V phase coil 102. The W phase current detecting unit 423 detects a W phase current Iw as a current that flows in the W phase coil 103. Detection values that are detected by the current detecting units 421 to 423 are input to the control device 500 via the amplifier circuit 430. The amplifier circuit 430 is used for turning detection values that are detected by the current detecting units 421 to 423 into proper values that can be processed within the control device 500.

The drive circuit 440 has a function of switching the SWs 411 to 416 on and off separately based on PWM signals, which are input from the control device 500.

The control device 500 is configured to exert overall control of the power conversion device 400 and includes, for example, a microcomputer. The control device 500 also includes, as illustrated in FIG. 3, a three-phase to two-phase conversion unit 510, a voltage command generating unit 520, a two-phase to three-phase conversion unit 530, a duty conversion unit 540, a PWM signal generating unit 550, and a carrier generating unit 560.

The three-phase to two-phase conversion unit 510 inputs the U phase current Iu, the V phase current Iv, and the W phase current Iw, which are detected by the current detecting units 421 to 423, and the electrical angle θ, which is obtained through conversion by the rotation angle sensor 200. Based on the input U phase current Iu, V phase current Iv, and W phase current Iw and on the input electrical angle θ, the three-phase to two-phase conversion unit 510 calculates a d-axis current detection value Id and a q-axis current detection value Iq.

The voltage command generating unit 520 performs current feedback computation from a d-axis current command value Id* and a q-axis current command value Iq*, and from the d-axis current detection value Id and the q-axis current detection value Iq, to thereby calculate a d-axis voltage command value Vd* and a q-axis voltage command value Vq*. Specifically, the voltage command generating unit 520 makes the d-axis current detection value Id and the q-axis current detection value Iq follow the current command values Id* and Iq*, respectively. The voltage command generating unit 520 accomplishes this by calculating the voltage command values Vd* and Vq* so that a current deviation ΔId, which is a deviation between the d-axis current command value Id* and the d-axis current detection value Id, and a current deviation ΔIq, which is a deviation between the q-axis current command value Iq* and the q-axis current detection value Iq, both converge to 0.

The two-phase to three-phase conversion unit 530 calculates three-phase voltage command values Vu*, Vv*, and Vw* based on the voltage command values Vd* and Vq* calculated by the voltage command generating unit 520, and on the electrical angle θ. It is preferred to set the three-phase voltage command values Vu*, Vv*, and Vw* to values equal to or less than a direct current power supply voltage input to the inverter unit 410, i.e., equal to or less than the voltage Vcon of the capacitor 302.

The duty conversion unit 540 generates duty command values Du, Dv, and Dw based on the three-phase voltage command values Vu*, Vv*, and Vw* calculated by the two-phase to three-phase conversion unit 530, and on the voltage Vcon of the capacitor 302.

The PWM signal generating unit 550 generates PWM signals by comparing the duty command values Du, Dv, and Dw, which are input from the duty conversion unit 540, with carriers Ucarr, Vcarr, and Wcarr, which are input from the carrier generating unit 560, in each phase. The PWM signal generating unit 550 outputs the generated PWM signals to the drive circuit 440, to thereby control the switching on and off of each of the SWs 411 to 416 separately. In FIG. 3, PWM signals generated by the PWM signal generating unit 550 include a signal for upper SWs of the U phase, which is denoted by UH_SW, a signal for lower SWs of the U phase, which is denoted by UL_SW, a signal for upper SWs of the V phase, which is denoted by VH_SW, a signal for lower SWs of the V phase, which is denoted by VL_SW, a signal for upper SWs of the W phase, which is denoted by WH_SW, and a signal for lower SWs of the W phase, which is denoted by WL_SW.

The carrier generating unit 560 generates the carriers Ucarr, Vcarr, and Wcarr for individually switching the switching frequencies of the respective phases, based on spectral diffusion index command values βu*, βv*, and βw* of the respective phases, which are input from the outside. The generated carriers are output to the PWM signal generating unit 550. The spectral diffusion index command values βu*, βv*, and βw* of the respective phases are set in order to diffuse electrical noise generated by the inverter unit 410 in a favorable manner, and correspond to the spectral diffusion index β of Expression (1).

The control device 500 thus controls, in time with PWM signals that are generated from duty command values and switching frequencies, a multi-phase inverter in which a plurality of half-bridge circuits each having one semiconductor switching element in the upper arm and one semiconductor switching element in the lower arm are connected in parallel.

Figure 4:
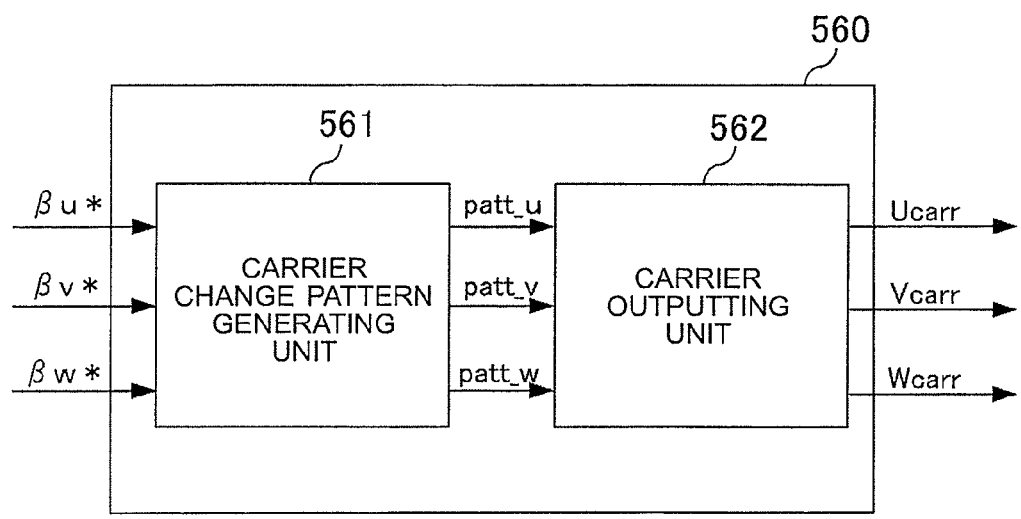
FIG. 4 is a block diagram for illustrating the configuration and processing of a carrier generating unit in the first embodiment of the present invention.

The configuration of the carrier generating unit 560 is described next with reference to FIG. 4. FIG. 4 is a block diagram for illustrating the configuration and processing of the carrier generating unit 560 in the first embodiment of the present invention.

As illustrated in FIG. 4, the carrier generating unit 560 includes a carrier change pattern generating unit 561 and a carrier outputting unit 562. The following description takes as an example a case of using triangular wave comparison that uses as carriers triangular waves shaped like isosceles triangles where the rising rate and the falling rate are equal to each other. However, sawtooth wave comparison or other methods may be employed instead.

The carrier change pattern generating unit 561 generates carrier change patterns patt_u, patt_v, and patt_w for the respective phases. Each of the carrier change patterns is set so that switching processing in which a plurality of switching frequencies included in one switching frequency set are switched sequentially is repeated for each repetition cycle Tm.

Specifically, the carrier change pattern generating unit 561 stores in advance a table that associates the spectral diffusion index command value βu* and the carrier change pattern patt_u with each other for the U phase. For example, switching frequencies included in one switching frequency set are defined in advance so that each spectral diffusion index command value βu* satisfies Expression (1), and the table defines in advance the carrier change pattern patt_u for each spectral diffusion index command value βu*. The carrier change pattern generating unit 561 similarly stores in advance a table that associates the spectral diffusion index command value βv* and the carrier change pattern patt_v for the V phase, and a table that associates the spectral diffusion index command value βw* and the carrier change pattern patt_w for the W phase.

The carrier change pattern generating unit 561 extracts from the table stored in advance the carrier change pattern patt_u of the U phase that is associated with the spectral diffusion index command value βu* of the U phase that is input from the outside, and outputs the extracted pattern to the carrier outputting unit 562. The carrier change pattern generating unit 561 similarly extracts from the tables stored in advance the carrier change patterns patt_v and patt_w that are associated respectively with the externally input spectral diffusion index command values βv* and βw*, and outputs the extracted patterns to the carrier outputting unit 562.

The carrier outputting unit 562 generates and outputs the U phase carrier Ucarr, the V phase carrier Vcarr, and the W phase carrier Wcarr in patterns that follow the carrier change patterns patt_u, patt_v, and patt_w of the respective phases input from the carrier change pattern generating unit 561.

Figure 5:
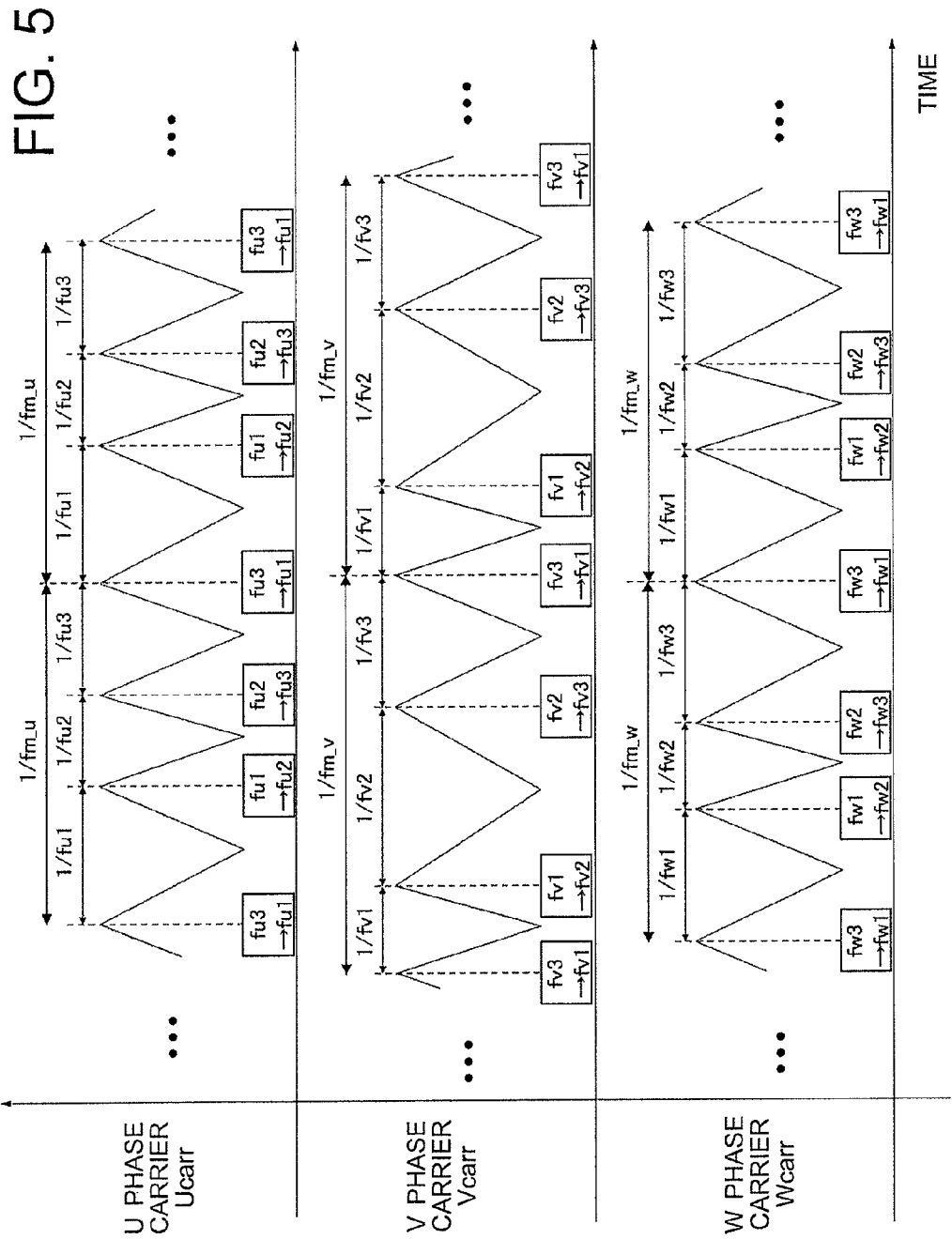
FIG. 5 is an explanatory diagram for showing an example of carriers that are generated for respective phases by the carrier generating unit in the first embodiment of the present invention.

A specific example of the carriers Ucarr, Vcarr, and Wcarr of the respective phases that the carrier outputting unit 562 outputs is described next with reference to FIG. 5. FIG. 5 is an explanatory diagram for showing an example of the carriers Ucarr, Vcarr, and Wcarr of the respective phases that are generated by the carrier generating unit 560 in the first embodiment of the present invention.

In the example of FIG. 5, the carrier change pattern generating unit 561 is configured so as to generate the carrier change patterns patt_u, patt_v, and patt_w for the respective phases, in which parameters that define each carrier change pattern, namely, the average switching frequency fc, the spectral diffusion index β, and the repetition frequency fm, fulfill Conditions (1) to (3).

Condition (1): The repetition cycle Tm (the repetition frequency fm) varies from one phase to another.

Condition (2): The average switching frequency fc varies from one phase to another.

Condition (3): The spectral diffusion index β varies from one phase to another.

More specifically, in the example of FIG. 5, three frequencies fu1, fu2, and fu3 are set as a plurality of switching frequencies included in a switching frequency set for the U phase, three frequencies fv1, fv2, and fv3 are set as a plurality of switching frequencies included in a switching frequency set for the V phase, and three frequencies fw1, fw2, and fw3 are set as a plurality of switching frequencies included in a switching frequency set for the W phase so that Conditions (1) to (3) are fulfilled. The switching frequencies in the U phase have a magnitude relation fu2>fu3>fu1. The switching frequencies in the V phase have a magnitude relation fv1>fv3>fv2. The switching frequencies in the W phase have a magnitude relation fw2>fw1>fw3.

In this case, a repetition frequency fm_u of the U phase satisfies a relation $1/fm\_u = 1/fu1 + 1/fu2 + 1/fu3$, a repetition frequency fm_v of the V phase satisfies a relation $1/fm\_v = 1/fv1 + 1/fv2 + 1/fv3$, and a repetition frequency fm_w of the W phase satisfies a relation $1/fm\_w = 1/fw1 + 1/fw2 + 1/fw3$.

An average switching frequency fc_u of the U phase, an average switching frequency fc_v of the V phase, and an average switching frequency fc_w of the W phase in this case are expressed by $3 \times fm\_u$, $3 \times fm\_v$, and $3 \times fm\_w$, respectively.

The spectral diffusion index command value βu* of the U phase, the spectral diffusion index command value βv* of the V phase, and the spectral diffusion index command value βw* of the W phase in this case are expressed by $(fu2-fu1)/fm\_u$, $(fv1-fv2)/fm\_v$, and $(fw2-fw3)/fm\_w$, respectively.

As shown in FIG. 5, the carrier generating unit 560 generates the carrier Ucarr for the U phase in a pattern that follows the carrier change pattern patt_u in order to repeatedly execute switching processing in which the plurality of switching frequencies fu1, fu2, and fu3 included in the relevant switching frequency set are switched sequentially for each repetition cycle Tm_u (=1/fu1+1/fu2+1/fu3). In other words, the carrier generating unit 560 outputs carriers for the U phase to the PWM signal generating unit 550 while changing the switching frequency in order from f1 to f2 to f3 then back to f1, and so on. While the switching frequency is switched at the peak of a carrier for each phase in the example of FIG. 5, the switching frequency may be switched at a valley between carrier waves instead.

The carrier generating unit 560 similarly generates the carrier Vcarr for the V phase in order to repeatedly execute switching processing in which the plurality of switching frequencies fv1, fv2, and fv3 are switched sequentially for each repetition cycle Tm_v (=1/fv1+1/fv2+1/fv3). The carrier generating unit 560 similarly generates the carrier Wcarr for the W phase in order to repeatedly execute switching processing in which the plurality of switching frequencies fw1, fw2, and fw3 are switched sequentially for each repetition cycle Tm_w (=1/fw1+1/fw2+1/fw3).

Figure 6:
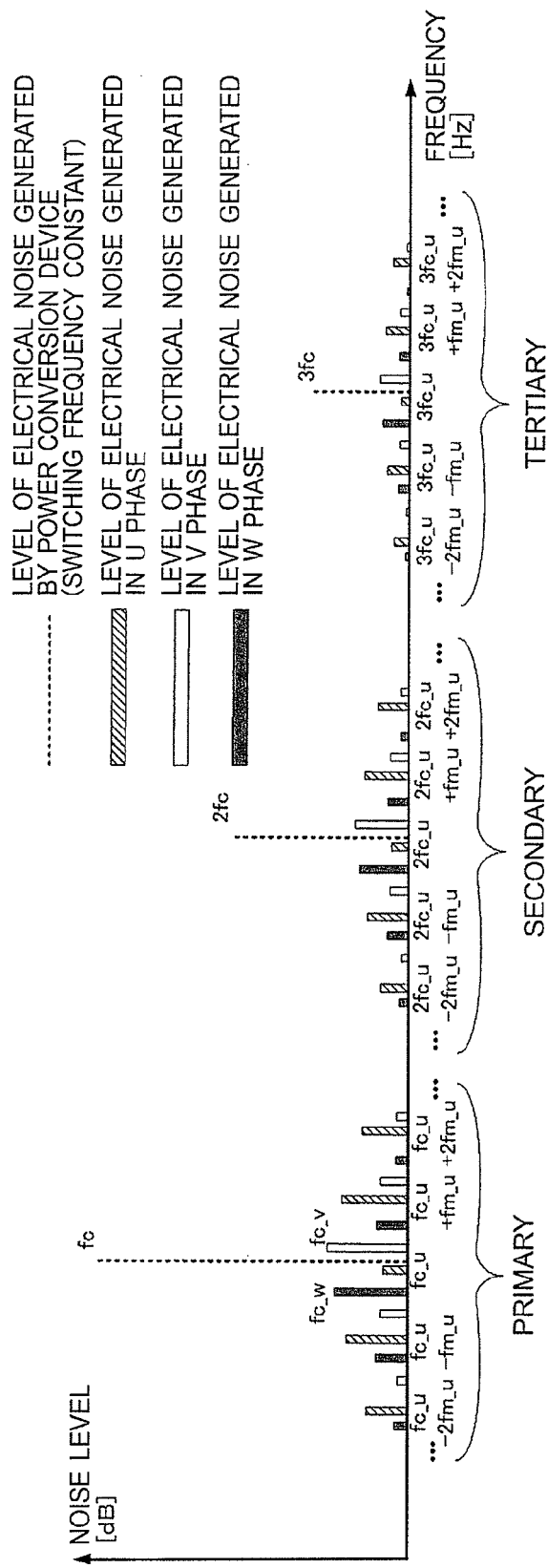
FIG. 6 is an explanatory diagram for showing electrical noise that is generated by an inverter unit of the power conversion device in the respective phases in the first embodiment of the present invention.

Described next with reference to FIG. 6 is electrical noise that is generated by the power conversion device 400 in the respective phases when switching elements are controlled as instructed by the duty command values while the switching frequency is switched for each phase separately, from one frequency to another sequentially based on the U phase carrier Ucarr, V phase carrier Ucarr, and W phase carrier Wcarr of FIG. 5. FIG. 6 is an explanatory diagram for showing electrical noise that is generated by the inverter unit 410 of the power conversion device 400 in the respective phases in the first embodiment of the present invention. The electrical noise generated includes primary electrical noise, secondary electrical noise, tertiary electrical noise, quaternary electrical noise, and so forth, and decreases as the order becomes higher. The quaternary electrical noise and subsequent electrical noise are therefore omitted in FIG. 6.

As shown in FIG. 6, the spectral diffusion and peak values of electrical noise of the respective phases are determined by the repetition frequencies fm_u, fm_v, and fm_w, the average switching frequencies fc_u, fc_v, and fc_w, and the spectral diffusion index command values βu*, βv*, and βw*.

Accordingly, a technical feature of the invention of this application is to have a configuration that makes the U phase carrier change pattern patt_u, the V phase carrier change pattern patt_v, and the W phase carrier change pattern patt_w differ from one another by adjusting the parameters, which are the average switching frequencies fc_u, fc_v, and fc_w, the spectral diffusion index command values βu*, βv*, and βw*, and the repetition frequencies fm_u, fm_v, and fm_w. This configuration lowers the peak value of electrical noise compared to the related art. Varying the average switching frequency fc from one phase to another, in particular, prevents the superimposition of electrical noise that has a peak value in one component on electrical noise that has a peak value in another component. The peak value of electrical noise is thus lowered, thereby reducing harm to other electronic devices and electromagnetic noise due to a switching frequency.

While the first embodiment takes as an example a case where the carrier change patterns patt_u, patt_v, and patt_w are generated so that Conditions (1) to (3) are all fulfilled, the present invention is not limited thereto. If the average switching frequency fc is varied from one phase to another in order to fulfill at least Condition (2), the superimposition of electrical noise that has a peak value in one component on electrical noise that has a peak value in another component can be avoided. The carrier change patterns patt_u, patt_v, and patt_w may therefore be generated so that at least Condition (2) is fulfilled.

While the first embodiment takes as an example a case where the switching frequency set of each phase includes three switching frequencies as shown in FIG. 5, it is sufficient if each switching frequency set includes at least two switching frequencies, and different switching frequency sets may not include the same number of switching frequencies.

While the first embodiment takes as an example a case where the U phase carrier change pattern patt_u, the V phase carrier change pattern patt_v, and the W phase carrier change pattern patt_w all differ from one another, the same effect is obtained when at least one of the carrier change patterns patt_u, patt_v, and patt_w differs from the carrier change patterns of the other phases.

While the first embodiment takes as an example a case where switching frequencies included in the switching frequency set of one phase differ in magnitude from those included in the switching frequency sets of the other phases, the same effect is obtained when at least one of switching frequencies included in the switching frequency set of one phase differs in magnitude from those included in the switching frequency sets of the other phases.

As described above, the first embodiment has a configuration for generating carrier change patterns of the respective phases, which are defined by parameters, specifically, the average switching frequency, the spectral diffusion index, and the repetition frequency, so that at least the carrier change pattern of one phase differs from the carrier change patterns of the other phases. The first embodiment also has a configuration for controlling the semiconductor switching elements as instructed by the duty command values while switching the switching frequency for each phase separately, from one frequency to another sequentially based on carriers that are output in patterns following the carrier change patterns of the respective phases, which are generated so that at least the carrier change pattern of one phase differs from the carrier change patterns of the other phases.

With carriers generated by following the carrier change pattern that is varied from one phase to another, unlike the related art where carriers are generated by following the carrier change pattern that is the same for each phase, the peak value of electrical noise is lowered and the spectrum of the electrical noise is dispersed more compared to the related art.

The first embodiment also has a configuration for generating carrier change patterns of the respective phases so that at least the carrier change pattern of one phase differs from the carrier change patterns of the other phases by varying at least the average switching frequency of one phase from the average switching frequencies of the other phases. This prevents the superimposition of electrical noise that has a peak value in one component on electrical noise that has a peak value in another component in all phases, and accordingly lowers the peak value of electrical noise.

Second Embodiment

The timing of executing the switching processing for the respective phases in relation to one another is not considered in the first embodiment. A second embodiment of the present invention describes a case in which the switching processing is executed at the same timing for each phase and the spectral diffusion indices β of the respective phases are adjusted so that the multi-phase inverter generates uniform electrical noise.

Figure 7:
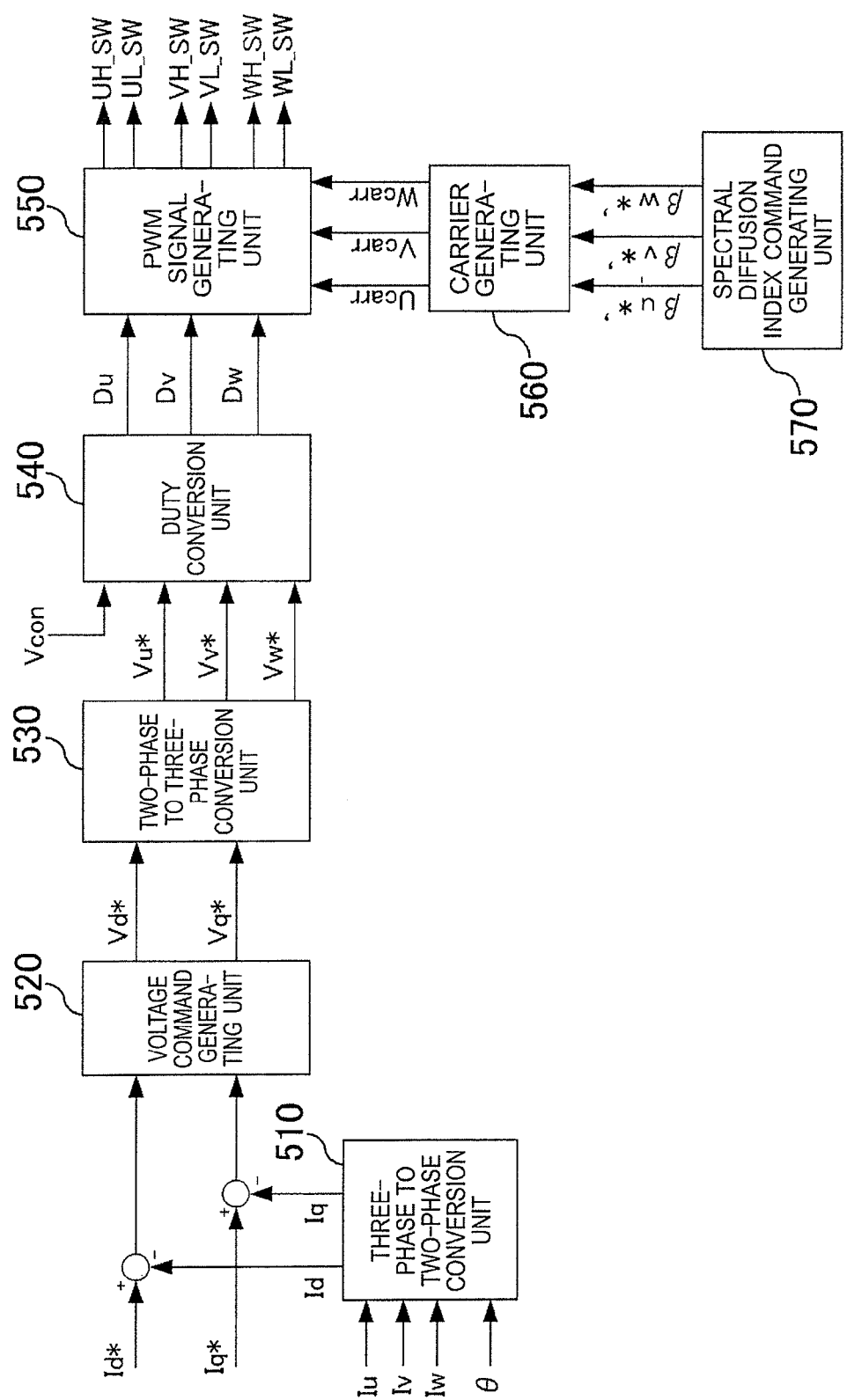
FIG. 7 is a block diagram for illustrating the configuration and processing of a power conversion device control device according to a second embodiment of the present invention.

FIG. 7 is a block diagram for illustrating the configuration and processing of the power conversion device control device 500 according to the second embodiment of the present invention. In FIG. 7, the control device 500 according to the second embodiment includes the three-phase to two-phase conversion unit 510, the voltage command generating unit 520, the two-phase to three-phase conversion unit 530, the duty conversion unit 540, the PWM signal generating unit 550, the carrier generating unit 560, and a spectral diffusion index command generating unit 570. Other components than the carrier generating unit 560 and spectral diffusion index command generating unit 570 of the control device 500 in the second embodiment are the same as those in the first embodiment, and descriptions thereof are omitted here.

As shown in FIG. 1, the electrical noise peak value of the average switching frequency fc is higher than electrical noise peak values of other frequencies when β is 1, for example, but is lower than electrical noise peak values of other frequencies when β is 5. The inventors of the present invention have therefore paid attention to the fact that the frequency at which the maximum peak value of electrical noise is output varies depending on the spectral diffusion index β.

The spectral diffusion index command generating unit 570 is accordingly configured so as to be capable of adjusting the spectral diffusion index for each phase separately in a manner that makes the electrical noise generated by the multi-phase inverter uniform, instead of allowing the peak value of the electrical noise to concentrate on a particular frequency. The thus configured spectral diffusion index command generating unit 570 automatically selects spectral diffusion index command values βu*', βv*', and βw*' of the respective phases that make the electrical noise generated by the multi-phase inverter uniform, and outputs the selected values to the carrier generating unit 560.

In the case where the switching of a three-phase inverter is controlled by PWM, it is a common practice to start computing, or to immediately make changes that reflect computation results, in at least one of a peak of a carrier and a valley between carrier waves. Computing is therefore started at a time that is obtained by subtracting the length of the computing from the time when at least one of the carrier peak and the carrier valley is reached. Carrier change patterns patt_u', patt_v', and patt_w' that make the switching processing execution timing of the three phases coincide with one another are generated for that reason.

Specifically, the carrier change pattern generating unit 561 stores in advance a table that associates the spectral diffusion index command value βu*' and the carrier change pattern patt_u' with each other for the U phase. For example, switching frequencies included in one switching frequency set are defined in advance so that each spectral diffusion index command value βu*' satisfies Expression (1), and the table defines in advance the carrier change pattern patt_u' for each spectral diffusion index command value βu*'. The carrier change pattern generating unit 561 similarly stores in advance a table that associates the spectral diffusion index command value βv*' and the carrier change pattern patt_v' for the V phase, and a table that associates the spectral diffusion index command value βw*' and the carrier change pattern patt_w' for the W phase.

The carrier change pattern generating unit 561 extracts from the table stored in advance the carrier change pattern patt_u' of the U phase that is associated with the spectral diffusion index command value βu*' of the U phase that is input from the spectral diffusion index command generating unit 570, and outputs the extracted pattern to the carrier outputting unit 562. The carrier change pattern generating unit 561 similarly extracts from the tables stored in advance the carrier change patterns patt_v' and patt_w' that are associated respectively with the spectral diffusion index command values βv*' and βw*' that are input from the spectral diffusion index command generating unit 570, and outputs the extracted patterns to the carrier outputting unit 562.

Figure 8:
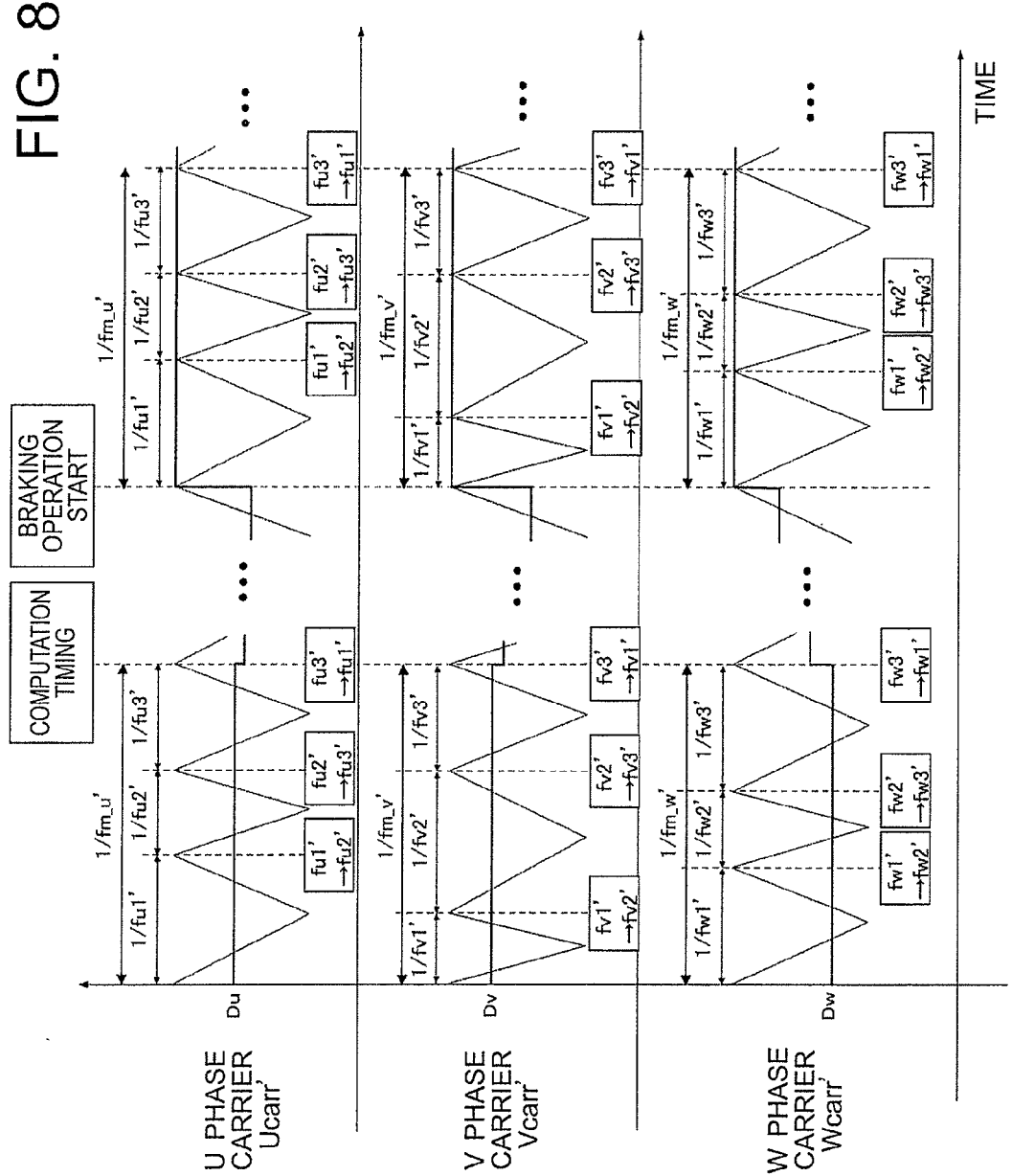
FIG. 8 is an explanatory diagram for showing an example of carriers that are generated for the respective phases by a carrier generating unit in the second embodiment of the present invention.

A specific example of carriers Ucarr', Vcarr', and Wcarr' of the respective phases that the carrier outputting unit 562 in the second embodiment outputs is described next with reference to FIG. 8. FIG. 8 is an explanatory diagram for showing an example of the carriers Ucarr', Vcarr', and Wcarr' of the respective phases that are generated by the carrier generating unit 560 in the second embodiment of the present invention.

In the example of FIG. 8, the carrier change pattern generating unit 561 is configured so as to generate the carrier change patterns patt_u', patt_v', and patt_w' for the respective phases, each of which fulfills Conditions (4) to (6).

Condition (4): The timing of executing switching processing is the same for each phase.

Condition (5): A repetition cycle Tm' (a repetition frequency fm') is the same for each phase.

Condition (6): An average switching frequency fc' is the same for each phase.

More specifically, in the example of FIG. 8, three frequencies fu1', fu2', and fu3' are set as a plurality of switching frequencies included in a switching frequency set for the U phase, three frequencies fv1', fv2', and fv3' are set as a plurality of switching frequencies included in a switching frequency set for the V phase, and three frequencies fw1', fw2', and fw3' are set as a plurality of switching frequencies included in a switching frequency set for the W phase so that Conditions (4) to (6) are fulfilled. The switching frequencies in the U phase have a magnitude relation fu2'>fu3'>fu1'. The switching frequencies in the V phase have a magnitude relation fv1'>fv3'>fv2'. The switching frequencies in the W phase have a magnitude relation fw2'>fw1'>fw3'.

In this case, as shown in FIG. 8, repetition frequencies fm_u', fm_v', and fm_w' of the respective phases satisfy a relation fm_u'=fm_v'=fm_w'. Further, average switching frequencies fc_u', fc_v', and fc_w' of the respective phases in this case satisfy a relation fc_u'=fc_v'=fc_w'.

The spectral diffusion index command value βu*' of the U phase, the spectral diffusion index command value βv*' of the V phase, and the spectral diffusion index command value βw*' of the W phase in this case are expressed by (fu2'−fu1')/fm_u', (fv1'−fv2')/fm_v', and (fw2'−fw3')/fm_w', respectively.

By executing computing at timing where carriers of the respective phases peak concurrently (i.e., timing where switching processing is executed concurrently for each phase) as shown in FIG. 8, changes in carrier change patterns, changes in duty command values, and the like can be controlled for all phases simultaneously, without a drop in control precision. In other words, the value of a command that is generally output when a motor performs braking operation (specifically, a command for switching the upper SWs on and switching the lower SWs off at a braking operation start point of FIG. 8) can be switched without any of the phases falling behind the other phases. In FIG. 8, the case where the upper SWs are switched on and the lower SWs are switched off is given as an example of when a relation "carrier<duty command value" is established.

Another advantage is that, with the cycle of executing computing kept constant, a gain parameter and the like in feedback control can easily be designed.

Described next with reference to FIG. 9 is electrical noise that is generated by the power conversion device 400 in the respective phases when switching elements are controlled as instructed by the duty command values while the switching frequency is switched for each phase separately, from one frequency to another sequentially based on the U phase carrier Ucarr', V phase carrier Ucarr', and W phase carrier Wcarr' of FIG. 8. FIG. 9 is an explanatory diagram for showing electrical noise that is generated by the inverter unit 410 of the power conversion device 400 in the respective phases in the second embodiment of the present invention.

The quaternary electrical noise and subsequent electrical noise are omitted in FIG. 9 as in FIG. 6.

As shown in FIG. 9, the spectral diffusion index command values βu*', βv*', and βw*' that make the electrical noise generated by the multi-phase inverter uniform are selected. In addition, the U phase average switching frequency fc_u', the V phase average switching frequency fc_v', and the W phase average switching frequency fc_w' are equal to one another, and the U phase repetition frequency fm_u', the V phase repetition frequency fm_v', and the W phase repetition frequency fm_w' are equal to one another.

Accordingly, electrical noise of the U phase, electrical noise of the V phase, and electrical noise of the W phase are dispersed on the same frequency and superimpose as well, based on the repetition frequencies fm_u', fm_v', and fm_w', the average switching frequencies fc_u', fc_v', and fc_w', and the spectral diffusion index command values βu*', βv*', and βw*'. The electrical noise is therefore diffused uniformly.

As described above, the second embodiment has, unlike the first embodiment, a configuration for generating carrier change patterns of the respective phases so that at least the carrier change pattern of one phase differs from the carrier change patterns of the other phases by setting the switching frequency execution timing to be the same for each phase, the repetition frequency to be the same for each phase, and the average switching frequency to be the same for each phase, and by determining spectral diffusion indices of the respective phases in a manner that makes electrical noise generated by the multi-phase inverter uniform.

The peak value of the electrical noise is thus lowered compared to the related art, and changes in carrier change patterns, changes in duty command values, and the like can be controlled without any of the phases falling behind the other phases.

Third Embodiment

The second embodiment has described a case of setting the switching frequency execution timing to be the same for each phase, the repetition frequency Tm' to be the same for each phase, and the average switching frequency fc' to be the same for each phase. Described in a third embodiment of the present invention is a case where the switching processing execution timing is set to be the same for each phase, a repetition cycle Tm" is set to be the same for each phase, and an average switching frequency fc" is varied from one phase to another.

The third embodiment differs from the second embodiment in that the carrier change pattern generating unit 561 of the carrier generating unit 560 generates a U phase carrier change pattern patt_u", a V phase carrier change pattern patt_v", and a W phase carrier change pattern patt_w" so that the average switching frequency fc" differs from one phase to another. In the third embodiment, the difference from the second embodiment is described while descriptions on aspects that are the same as those of the second embodiment are omitted.

FIG. 10 is an explanatory diagram for showing an example of carriers Ucarr", Vcarr", and Wcarr" of the respective phases that are generated by the carrier generating unit 560 in the third embodiment of the present invention.

In the example of FIG. 10, the carrier change pattern generating unit 561 is configured so as to generate the carrier change patterns patt_u", patt_v", and patt_w" for the respective phases, each of which fulfills Conditions (7) to (9).

Conditions (7) and (8) are the same as Conditions (4) and (5) in the second embodiment.

Condition (7): The timing of executing switching processing is the same for each phase.

Condition (8): A repetition cycle Tm" (a repetition frequency fm") is the same for each phase.

Condition (9): An average switching frequency fc" differs from one phase to another.

More specifically, in the example of FIG. 10, two frequencies fu1" and fu2" are set as a plurality of switching frequencies included in a switching frequency set for the U phase, three frequencies fv1", fv2", and fv3" are set as a plurality of switching frequencies included in a switching frequency set for the V phase, and four frequencies fw1", fw2", fw3", and fw4" are set as a plurality of switching frequencies included in a switching frequency set for the W phase so that Conditions (7) to (9) are fulfilled. The switching frequencies in the U phase have a magnitude relation fu1">fu2". The switching frequencies in the V phase have a magnitude relation fv2">fv3">fv1". The switching frequencies in the W phase have a magnitude relation fw2">fw4">fw1">fw3".

In this case, repetition frequencies fm_u", fm_v", and fm_w" of the respective phases satisfy a relation fm_u"=fm_v"=fm_w".

Average switching frequencies fc_u", fc_v", and fc_w" of the respective phases in this case satisfy a relation fc_u"<fc_v"<fc_w".

A spectral diffusion index command value βu*" of the U phase, a spectral diffusion index command value βv*" of the V phase, and a spectral diffusion index command value βw*" of the W phase in this case are expressed by (fu1"−fu2")/fm_u", (fv2"−fv1")/fm_v", and (fw2"−fw3")/fm_w", respectively.

In FIG. 10, the number of switching frequencies included in a switching frequency set is thus varied from one phase to another, to thereby fulfill Condition (9) and vary the average switching frequency fc" from one phase to another. The superimposition of electrical noise that has a peak value in one component on electrical noise that has a peak value in another component is accordingly prevented as in the first embodiment.

As described above, the third embodiment has, in contrast to the first embodiment, a configuration for generating carrier change patterns of the respective phases so that at least the carrier change pattern of one phase differs from the carrier change patterns of the other phases by setting the switching frequency execution timing to be the same for each phase, the repetition frequency to be the same for each phase, and the average switching frequency of at least one of the phases to differ from the average switching frequencies of the other phases.

The peak value of the electrical noise is thus lowered compared to the related art, and changes in carrier change patterns, changes in duty command values, and the like can be controlled without any of the phases falling behind the other phases.

Fourth Embodiment

The second embodiment and the third embodiment have described a case of setting the repetition cycle to be the same for each phase. Described in a fourth embodiment of the present invention is a case of setting a repetition cycle Tm'" so that the repetition cycle Tm'" of one phase is longer than the repetition cycles Tm'" of the other phases.

When the spectral diffusion index β is to be increased for the purpose of enhancing the effect of dispersing the spectrum of electrical noise, based on Expression (1), that the spectral diffusion index β can be increased by increasing the switching frequency difference Δf or reducing the repetition frequency fm.

However, increasing the switching frequency difference Δf by driving the power conversion device 400 at an increased value of the maximum switching frequency fmax may require a high-speed computing device and an additional cost, depending on the value of the maximum switching frequency fmax. Driving the power conversion device 400 at a reduced value of the minimum switching frequency fmin, on the other hand, may increase ripples in a current output from the power conversion device 400, depending on the value of the minimum switching frequency fmin.

The fourth embodiment therefore increases the spectral diffusion index β by setting a repetition frequency fm''' of one phase to be lower than repetition frequencies fm''' of the other phases, while avoiding increasing the switching frequency difference Δf and while setting the switching processing execution timing to be the same for each phase.

The fourth embodiment differs from the second embodiment and the third embodiment in that the carrier change pattern generating unit 561 of the carrier generating unit 560 generates a U phase carrier change pattern patt_u''', a V phase carrier change pattern patt_v''', and a W phase carrier change pattern patt_w''' so that the repetition cycle Tm''' of the U phase is longer than the repetition cycles Tm''' of the V phase and the W phase. In the fourth embodiment, the difference from the second embodiment and the third embodiment is described while descriptions on aspects that are the same as those of the second embodiment and the third embodiment are omitted.

FIG. 11 is an explanatory diagram for showing an example of carriers Ucarr''', Vcarr''', and Wcarr''' of the respective phases that are generated by the carrier generating unit 560 in the fourth embodiment of the present invention.

In the example of FIG. 11, the carrier change pattern generating unit 561 is configured so as to generate the carrier change patterns patt_u''', patt_v''', and patt_w''' for the respective phases, each of which fulfills Conditions (10) and (11). Condition (10) is the same as Condition (4) in the second embodiment.

Condition (10): The timing of executing switching processing is the same for each phase.

Condition (11): The repetition cycle Tm''' of one phase is longer than the repetition cycles Tm''' of the other phases (in other words, the repetition frequency fm''' of one phase is lower than the repetition frequencies fm''' of the other phases).

More specifically, in the example of FIG. 11, four frequencies fu1''', fu2''', fu3''', and fu4''' are set as a plurality of switching frequencies included in a switching frequency set for the U phase, two frequencies fv1''' and fv2''' are set as a plurality of switching frequencies included in a switching frequency set for the V phase, and two frequencies fw1''' and fw2''' are set as a plurality of switching frequencies included in a switching frequency set for the W phase so that Conditions (10) and (11) are fulfilled. The switching frequencies in the U phase have a magnitude relation fu1'''>fu3'''>fu4'''>fu2'''. The switching frequencies in the V phase have a magnitude relation fv1'''>fv2'''. The switching frequencies in the W phase have a magnitude relation fw2'''>fw1'''.

In this case, repetition frequencies fm_u''', fm_v''', and fm_w''' of the respective phases satisfy a relation 1/fm_u'''=1/fu1'''+1/fu2'''+1/fu3'''+1/fu4'''. Further, the repetition frequencies satisfy a relation fm_u'''<fm_v'''=fm_w'''.

A spectral diffusion index command value βu*''' of the U phase, a spectral diffusion index command value βv*''' of the V phase, and a spectral diffusion index command value βw*''' of the W phase in this case are expressed by (fu1'''−fu2''')/fm_u''', (fv1'''−fv2''')/fm_v''', and (fw2'''−fw1''')/fm_w''', respectively.

In FIG. 11, the switching processing execution timing of the U phase coincides with the switching processing execution timing of the V phase and the switching processing execution timing of the W phase. Specifically, the carrier of each phase peaks at timing where the switching frequency is switched from fu2''' to fu3''' in the U phase carrier Ucarr'''. The carrier of each phase also peaks at timing where a switch from fu4''' to fu1''' takes place in the U phase carrier Ucarr'''. This means that a repetition cycle Tm_u''' is twice longer than a repetition cycle Tm_v''' and twice longer than a repetition cycle Tm_w'''.

The repetition frequency fm''' of the U phase is thus set to be lower than the repetition frequencies fm''' of the V phase and the W phase in FIG. 11, thereby increasing the spectral diffusion index β to a desired value while avoiding increasing the switching frequency difference Δf for the U phase and while setting the switching processing execution timing to be the same for each phase. Accordingly, the increase in cost and the increase of ripples in the current output by the power conversion device 400 are prevented even more effectively.

As described above, the fourth embodiment has a configuration for generating carrier change patterns of the respective phases so that at least the carrier change pattern of one phase differs from the carrier change patterns of the other phases by setting the repetition frequency of one phase lower than the repetition frequencies of the other phases, as opposed to the settings in the first embodiment, and by making the switching processing execution timing of the one phase coincide with the switching processing execution timing of the other phases.

In this manner, the same effects as those in the second embodiment and the third embodiment are obtained, and the increase in cost and the increase of ripples in the current output by the power conversion device are prevented even more effectively.

The numbers of switching frequencies that are included in the switching frequency sets of the respective phases in the fourth embodiment are given as an example, and the present invention is not limited thereto. While the first embodiment to the fourth embodiment take as an example a case where the invention of this application is applied to a multi-phase inverter, the present invention is also applicable to a single-phase inverter.

What is claimed is:

1. A power conversion device control device for controlling, in time with PWM signals that are generated from duty command values and switching frequencies, a multi-phase inverter in which a plurality of half-bridge circuits each comprising a first semiconductor switching element in an upper arm and a second semiconductor switching element in a lower arm are connected in parallel, the power conversion device control device comprising:

a carrier generating unit for generating and outputting, for each of different phases, a carrier in a carrier change pattern switching between a plurality of switching frequencies sequentially and repeatedly for each repetition cycle that is a reciprocal of a repetition frequency, the carrier change pattern of each of the different phases having an average switching frequency and a spectral diffusion index, and a first average switching frequency of a first carrier change pattern among the carrier change pattern of each of the different phases being different from a second average switching frequency of a second carrier change pattern among the carrier change pattern of each of the different phases; and a PWM signal generating unit for generating, for each of the different phases, the PWM signals that are used for controlling the first semiconductor switching element and the second semiconductor switching element as instructed by the duty command values, while sequentially switching from one of the plurality of switching frequencies to another of the plurality of switching frequencies, based on the carrier output by the carrier generating unit.

2. The power conversion device control device according to claim 1, wherein the carrier change pattern of each of the different phases has a same timing of executing the switching between the plurality of switching frequencies, and a first repetition frequency of the first carrier change pattern is equal to a second repetition frequency of the second carrier change pattern.

3. The power conversion device control device according to claim 1, wherein a first repetition frequency of the first carrier change pattern is less than a second repetition frequency of the second carrier change pattern, and the carrier change pattern of each of the different phases has a same timing of executing the switching between the plurality of switching frequencies.

4. A power conversion device control for controlling, in time with PWM signals that are generated from duty command values and switching frequencies, a multi-phase inverter in which a plurality of half-bridge circuits each comprising a first semiconductor switching element in an upper arm and a second semiconductor switching element in a lower arm are connected in parallel, the power conversion device control device comprising:

a carrier generating unit for generating and outputting, for each of different phases, a carrier in a carrier change pattern switching between a plurality of switching frequencies sequentially and repeatedly for each repetition cycle that is a reciprocal of a repetition frequency, the carrier change pattern of each of the different phases having an average switching frequency and a spectral diffusion index, and a first carrier change pattern among the carrier change pattern of each of the different phases being different from a second carrier change pattern among the carrier change pattern of each of the different phases; and a PWM signal generating unit for generating, for each of the different phases, the PWM signals that are used for controlling the first semiconductor switching element and the second semiconductor switching element as instructed by the duty command values, while sequentially switching from one of the plurality of switching frequencies to another of the plurality of switching frequencies, based on the carrier output by the carrier generating unit, wherein the carrier change pattern of each of the different phases has a same timing of executing the switching between the plurality of switching frequencies, a first repetition frequency of the first carrier change pattern is equal to a second repetition frequency of the second carrier change pattern, a first average switching frequency of the first carrier change pattern is equal to a second average switching frequency of the second carrier change pattern, and a first spectral diffusion index of the first carrier change pattern is different from a second spectral diffusion index of the second carrier change pattern so that electrical noise that is generated by the multi-phase inverter is uniform.

5. A power conversion device control method, comprising:

a carrier generation step of generating and outputting, in a multi-phase inverter in which a plurality of half-bridge circuits each comprising a first semiconductor switching element in an upper arm and a second semiconductor switching element in a lower arm are connected in parallel, for each of different phases, a carrier in a carrier change pattern switching between a plurality of switching frequencies sequentially and repeatedly for each repetition cycle that is a reciprocal of a repetition frequency, the carrier change pattern of each of the different phases having an average switching frequency and a spectral diffusion index, and a first average switching frequency of a first carrier change pattern among the carrier change pattern of each of the different phases being different from a second average switching frequency of a second carrier change pattern among the carrier change pattern of each of the different phases; and a PWM signal generation step of generating, for each of the different phases, PWM signals that are used for controlling the first semiconductor switching element and the second semiconductor switching element as instructed by the duty command values, while sequentially switching from one of the plurality of switching frequencies to another of the plurality of switching frequencies, based on the carrier output in the carrier generation step.

* * * * *